US007530912B2

(12) United States Patent
Kramer

(10) Patent No.: US 7,530,912 B2
(45) Date of Patent: May 12, 2009

(54) DRIVELINE MOTOR WITH PLANETARY GEAR SYSTEM

(75) Inventor: Dennis A. Kramer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 339 days.

(21) Appl. No.: 11/370,413

(22) Filed: Mar. 8, 2006

(65) Prior Publication Data
US 2006/0244317 A1    Nov. 2, 2006

Related U.S. Application Data

(60) Provisional application No. 60/675,269, filed on Apr. 27, 2005.

(51) Int. Cl.
*F16H 3/72* (2006.01)
*H02K 7/06* (2006.01)
(52) U.S. Cl. ............................. 475/5; 310/83
(58) Field of Classification Search ............... 475/5; 477/3, 7; 310/83, 75 R; 180/65.2–65.6, 180/372
See application file for complete search history.

(56) References Cited

U.S. PATENT DOCUMENTS 2,450,290 A * 9/1948 Maxwell ................. 310/83
3,477,315 A * 11/1969 Macks ..................... 475/149
4,918,344 A * 4/1990 Chikamori et al. ............ 310/83
5,372,213 A * 12/1994 Hasebe et al. ............. 180/65.6
5,382,854 A * 1/1995 Kawamoto et al. ........ 310/67 R
6,625,534 B2 * 9/2003 Suzuki et al. ................ 701/62
7,105,964 B2 * 9/2006 Miyazaki et al. .......... 310/75 R

FOREIGN PATENT DOCUMENTS

| DE | 199 15 926 A1 | 3/2000 |
| EP | 0 677 414 A | 10/1995 |
| JP | 04 185207 A | 7/1992 |
| JP | 2004-201358 A * | 7/2004 |

OTHER PUBLICATIONS

English translation of DE19915926, http://www.worldlingo.com/wl/epo/epo.html, Apr. 16, 2008.*
International Search Report dated Aug. 22, 2006.

* cited by examiner

*Primary Examiner*—Roger Pang
(74) *Attorney, Agent, or Firm*—Carlson, Gaskey & Olds PC

(57) ABSTRACT

A switched reluctance motor includes a stator, a rotor, and a planetary gear assembly. The rotor defines an internal cavity that houses the planetary gear assembly. The switched reluctance motor receives input and provides output through a common single shaft. The shaft is part of a vehicle driveline and can be positioned to provide driving input to a transmission or drive axle, for example. The planetary gear assembly includes a planet carrier that is fixed for rotation with the shaft and a sun gear that is coupled to the rotor. The planetary gear assembly allows the rotor to rotate at a higher speed than the shaft such that the switched reluctance motor can operate more efficiently for low speed vehicle applications.

20 Claims, 2 Drawing Sheets

DRIVELINE MOTOR WITH PLANETARY
GEAR SYSTEM

RELATED APPLICATION

This application claims priority to provisional application Ser. No. 60/675,269, which was filed on Apr. 27, 2005.

TECHNICAL FIELD

The subject invention relates to a switched reluctance motor that is incorporated into a vehicle driveline for storing and generating energy for a parallel hybrid system where the switched reluctance motor includes a planetary gear assembly that allows the switched reluctance motor to operate at a higher speed range, increasing motor efficiency for low-speed vehicle applications.

BACKGROUND OF THE INVENTION

Traditional friction brakes and retarders do not recover any energy during braking. One example of a retarder is an eddy current retarder that absorbs energy for braking by dissipating the energy as heat.

In a parallel hybrid design for driving a drive axle, motors are used to recover braking energy. This braking energy is stored in batteries or ultra-capacitors, however, current designs are very inefficient. To improve efficiency for current systems, significant changes to a vehicle driveline would be required to increase motor/generator speed relative to driveline speed. This increase is especially important for low-speed vehicle applications such as mass transit and refuse collection applications.

As known, motor efficiency is highest when the motor is operating within a high speed range. As motor speed decreases, i.e. approaches zero, motor efficiency correspondingly decreases, i.e. approaches zero. For example, 3000 rpm is a typical motor operating speed and when a motor is operating at this level, motor efficiency is high. However, when the motor is operating at only 500 rpm, motor efficiency is drastically reduced. Low-speed, stop-and-go vehicle applications, typically operate within the 500 rpm range.

Thus, there is a need for a motor/generator combination for a parallel hybrid system that can operate in a high efficiency range even for low-speed applications.

SUMMARY OF THE INVENTION

A motor includes a rotor, which is a rotating motor component, and a stator, which is a non-rotating motor component. In one example, the rotor defines an internal cavity. A gear assembly is positioned within the internal cavity and is coupled to the rotor. A driveline component is coupled to the gear assembly, which rotates the rotor at a faster speed than the driveline component to allow the motor to operate in a more efficient operating range for low speed vehicle applications.

The driveline component comprises a single through-shaft that comprises both the driving input and output for the motor. The gear assembly comprises at least one planetary gear assembly having a sun gear, a plurality of planet gears, a ring gear, and a planet carrier that supports the plurality of planet gears. The planet carrier is attached to the through-shaft, the sun gear is mounted for rotation with the rotor, and the ring gear is a non-rotating component. This configuration allows the motor to efficiently store and generate energy as needed for low speed vehicle applications.

The motor is preferably used as part of a parallel hybrid system, and can be incorporated into many different locations within a vehicle driveline. For example, the motor can be used to provide driving input to a transmission or axle assembly. Further, a single motor can be used in the vehicle driveline, or multiple motors can be used if needed.

These and other features of the present invention can be best understood from the following specification and drawings, the following of which is a brief description.

DETAILED DESCRIPTION OF THE PREFERRED EMBODIMENT

Figure 1:
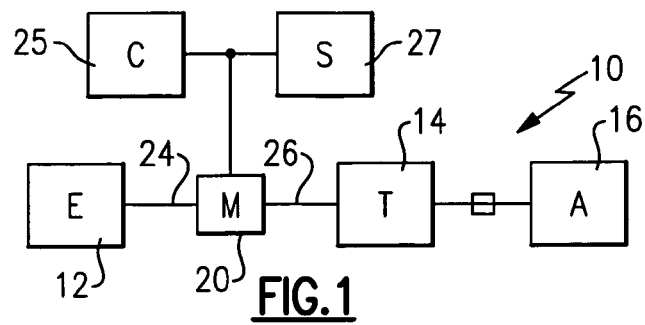
FIG. 1 is a schematic representation of one driveline configuration incorporating the subject invention.

A vehicle driveline is shown generally at 10 in FIG. 1. The vehicle driveline 10 includes an engine 12 that provides driving input to a transmission 14, which provides driving input to an axle assembly 16. The axle assembly 16 can comprise any type of axle assembly including single drive and tandem drive axle assemblies, for example. Further, it should be understood that the vehicle driveline 10 could include additional driveline components such as range boxes, drop-boxes, clutches, etc., as known.

Figure 2:
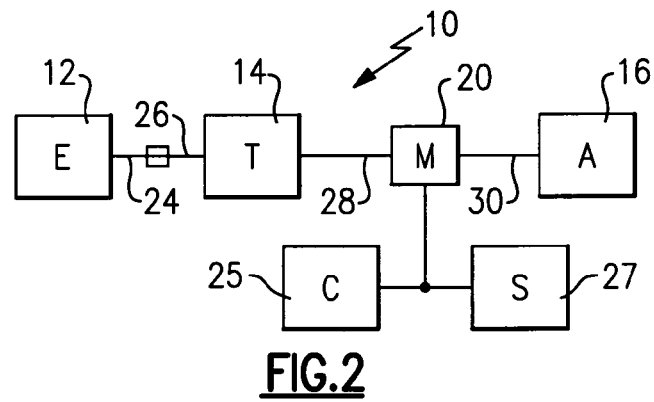
FIG. 2 is a schematic representation of another driveline configuration incorporating the subject invention.
Figure 3:
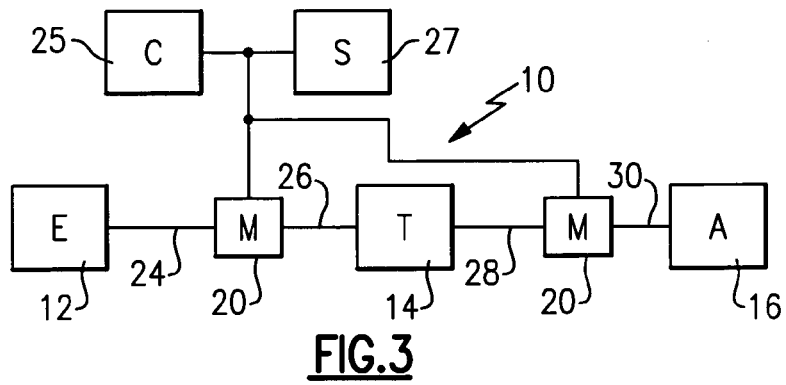
FIG. 3 is a schematic representation of another driveline configuration incorporating the subject invention.
Figure 4:
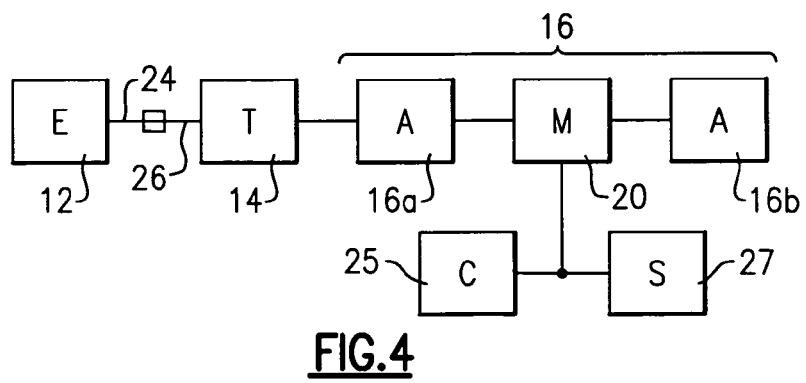
FIG. 4 is a schematic representation of another driveline configuration incorporating the subject invention.

In the example shown in FIG. 1, a motor assembly 20 is positioned between the engine 12 and transmission 14. In this configuration the motor assembly 20 is coupled to a through-shaft 22 (see FIGS. 5-6) that is at least one of a motor output shaft 24 or transmission input shaft 26. In the example shown in FIG. 2, the motor assembly 20 is positioned between the transmission 14 and the axle assembly 16. In this configuration the through-shaft 22 is at least one of a transmission output shaft 28 or axle input shaft 30. In the example shown in FIG. 3, two (2) motor assemblies 20 are utilized in the vehicle driveline 10. FIG. 4 shows the axle assembly 16 as a tandem axle assembly including a forward-rear drive axle 16a and a rear-rear drive axle 16b. The motor assembly 20 in this example is positioned between the forward-rear 16a and rear-rear 16b axle assemblies.

In each of the configurations, the motor assembly 20 is used to increase or decrease torque to the through-shaft 22 as needed. This is especially beneficial for parallel hybrid vehicle systems where electric motors are used to supplement driving input and braking as needed, and are also used to recover energy during braking. The motor assembly 20 is controlled by a vehicle controller 25 that determines when torque should be increased or decreased. Additionally, a storage device 27, such as a battery or capacitor is used to store energy recovered during braking.

Figure 5:
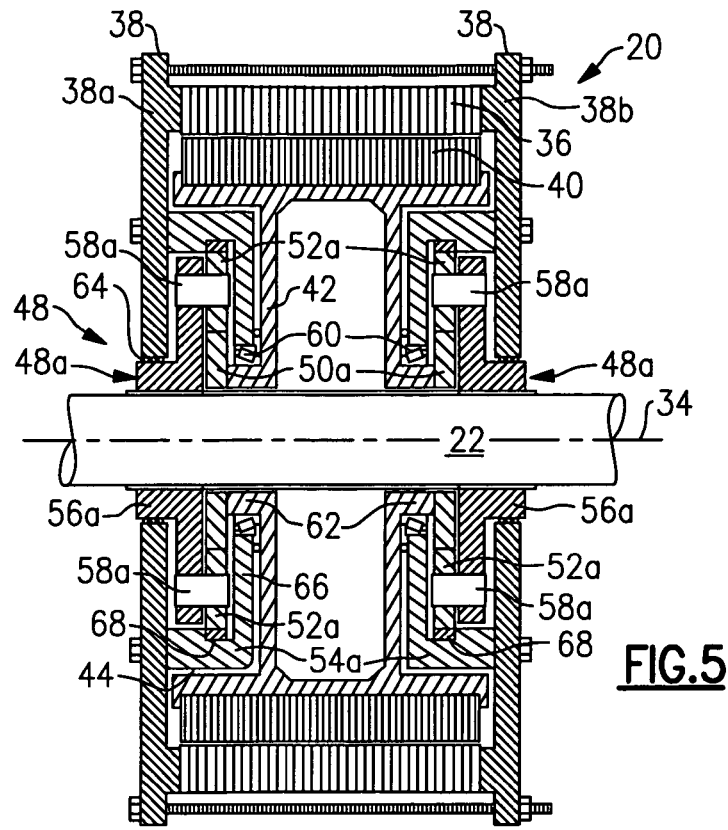
FIG. 5 is a cross-sectional view of a motor and gear assembly showing one example of a gear assembly configuration.

As shown in FIG. 5, the motor assembly 20 is coupled to the through-shaft 22, which rotates about an axis 34. The motor assembly 20 includes a stator 36 supported by a stator housing 38 and a rotor 40 supported by a rotor housing 42. In the example shown, the stator 36 and stator housing 38 are non-rotating components and are mounted to a non-rotating vehicle component such as an engine housing, transmission housing, axle housing, or vehicle frame member. The rotor 40 and rotor housing 42 are rotating components that rotate with the through-shaft 22. The rotor 40 is positioned within the stator 36. It should be understood that an opposite configuration could also be utilized where the rotor 40 and rotor housing 42 surround the stator 36 and stator housing 38.

The stator housing 38 is formed from two housing halves 38a, 38b that are fastened together. The rotor housing 42 can be formed as a single piece or can be formed from multiple pieces. The rotor housing 42 defines an internal cavity 44 that surrounds the through-shaft 22.

The stator 36 and rotor 40 cooperate to form a switched reluctance motor. The stator 36 could be water or glycol cooled to prevent the motor assembly 20 from overheating. Unlike other brushless motors, which include magnets etc., the switched reluctance motor uses laminations of materials to form the stator 36 and rotor 40. Thus, the stator 36 and the rotor 40 are comprised of a plurality of laminate layers that are stacked together. A typical configuration would provide a toothed lamination stack for the rotor 40 and stator 36 with a coil on each tooth. In one example, the stator 36 includes eighteen teeth and the rotor includes twelve teeth. The materials used to form the laminate layers are well known and will not be discussed in further detail.

Figure 6:
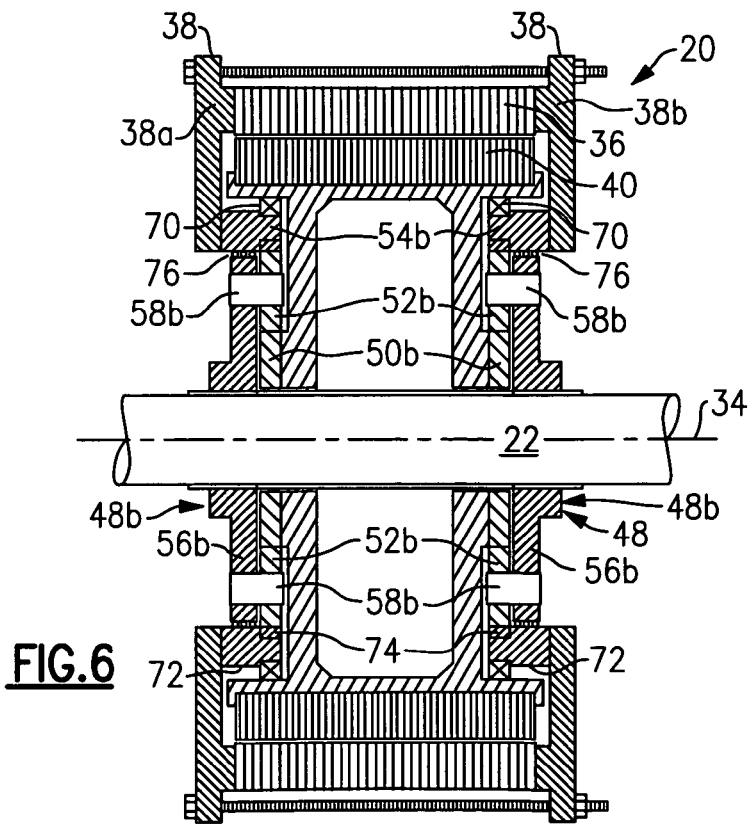
FIG. 6 is a cross-sectional view of a motor and gear assembly showing another example of a gear assembly configuration.

A gear assembly 48 is coupled to the through-shaft 22 and the rotor housing 42. FIG. 5 shows one example of a gear configuration comprising a first gear assembly 48a, and FIG. 6 shows another example of a gear configuration comprising second gear assembly 48b. In the examples shown, the motor assembly 20 includes two first gear assemblies 48a or two second gear assemblies 48b axially spaced apart from each other along axis 34, i.e. one at each side of the rotor housing 42. However, a single first 48a or second 48b gear assembly could be used in the motor assembly 20 depending upon the vehicle application.

As shown in FIG. 5, the first gear assembly 48a preferably comprises planetary gear set that includes a sun gear 50a, a plurality of planet gears 52a in meshing engagement with the sun gear 50a, and a ring gear 54a in meshing engagement with the plurality of planet gears 52a. A planet carrier 56a supports the plurality of planet gears 52a with each planet gear 52a being supported on a planet pin 58a. The planet carrier 56a is mounted for rotation with the through-shaft 22 and the ring gear 54a is mounted to the stator housing 38. Preferably, the planet carrier 56a is splined directly to the through-shaft 22.

A bearing 60 is mounted between the rotor housing 42 and the ring gear 54a. The bearing 60 is mounted on a rotor housing extension portion 62. A seal 64 is positioned between the stator housing 38 and the planet carrier 56a. The ring gear 54a is cup-shaped with a base portion 66 that engages the bearing 60 and a toothed portion 68 extending transversely to the base portion 66 to engage the plurality of planet gears 52a.

The rotor 40 and rotor housing 42 are coupled to the sun gear 50a for rotation about the axis 34. Thus, the rotor 40 drives the sun gear 50a, which drives the plurality of planet gears 52a, which react against the non-rotating ring gear 54a to drive the planet carrier 56a. The planet carrier 56a then drives the through-shaft 22.

As shown in FIG. 6, the second gear assembly 48b preferably comprises planetary gear set that includes a sun gear 50b, a plurality of planet gears 52b in meshing engagement with the sun gear 50b, and a ring gear 54b in meshing engagement with the plurality of planet gears 52b. A planet carrier 56b supports the plurality of planet gears 52b with each planet gear 52b being supported on a planet pin 58b. The planet carrier 56b is mounted for rotation with the through-shaft 22 and the ring gear 54b is mounted to the stator housing 38. Preferably, the planet carrier 56b is splined directly to the through-shaft 22.

A bearing 70 is mounted between the rotor housing 42 and the ring gear 54b. The bearing 70 is preferably a composite type bearing and is mounted on an outer circumference 72 of the ring gear 54b. The ring gear 54b is ring-shaped with a toothed portion 74 that engages the plurality of planet gears 52b. A seal 76 is positioned between the planet carrier 56b and the ring gear 54b, which is fixed to the stator housing 38.

The rotor 40 and rotor housing 42 are coupled to the sun gear 50b for rotation about the axis 34. Thus, the rotor 40 drives the sun gear 50b, which drives the plurality of planet gears 52b, which react against the non-rotating ring gear 54b to drive the planet carrier 56b. The planet carrier 56b then drives the through-shaft 22.

The first gear assembly 48a utilizes a smaller diameter bearing 60 and smaller diameter seal 64 than the bearing 70 and seal 76 used with the second gear assembly 48b. The second gear assembly 48b provides a larger diameter layout that lends itself to a large ring type composite bearing. Both configurations could use powered iron technology for the plurality of planet gears 52a, 52b.

In either configuration, the gear assembly 48 allows the rotor 40 to rotate faster than the through-shaft 22. Preferably, the rotor 40 rotates at least three (3) times faster than the through-shaft 22. This allows the motor assembly 20 to operate in a high efficiency range for the motor assembly 20. This is beneficial for low-speed, stop-and-go vehicle applications, such as mass-transit vehicles and refuse collection vehicles, for example. When traditional motor configurations are used, the low-speed duty cycle for these types of applications would have the motor assembly 20 operating at a very low efficiency. By utilizing the gear assembly 48, the motor assembly 20 is always maintained in a high efficiency operating range.

As an example for either configuration, the rotor-to-shaft speed (RTS) equals the number of ring gear teeth (RT) divided by the number of sun gear teeth (ST) plus 1 (RTS=#RT/ST+1). The number of ring gear and sun gear teeth can be varied as need to provide a desired rotor-to-shaft speed conversion. Straight spur gear or helical gearing could be used for gear components.

As discussed above, two gear assemblies 48 could be used, which would provide a balanced right-hand/left-hand design. This allows for increased shaft side loads. Optionally, a single gear assembly 48 could be used at one side, which would be cantilevered off of an axle or housing mount, for example, for additional support.

In any of the configurations, the gear assembly 48 is housed within the internal cavity 44 provided by the rotor housing 42. The stator housing 38 cooperates with the rotor housing 42 to enclose the gear assembly 48 within the motor assembly 20.

This combination of the motor assembly 20 and gear assembly 48 provides a lower cost and more robust switched reluctance motor with an integral speed reduction using an interior volume of the motor assembly 20. The motor assembly and gear assembly 48 provide increased efficiency at low speeds due to gearing between the through-shaft 22 and rotor 40. Additionally, motor cooling can be performed externally of motor assembly 20 as rotor cooling is not required in this configuration.

Drive motoring and retardation is provided in parallel with the through-shaft 22. Further, the stator housing 38 is easily adapted for various driveline mounting positions. Compact, lightweight motor assemblies that include coaxial installation could be utilized for a parallel hybrid at an axle carrier nose, transmission tail, or between the engine and transmission.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A motor assembly comprising:
a stator supported by a stator housing;
a rotor supported by a rotor housing and rotatable about an axis relative to said stator, wherein said rotor housing defines an internal cavity;
a gear assembly coupled to said rotor and positioned within said internal cavity wherein said gear assembly comprises at least one planetary gear set including a sun gear coupled to said rotor, a ring gear fixed to said stator housing, a plurality of planet gears in meshing engagement with said sun gear and said ring gear, and a planet carrier supporting said plurality of planet gears;
at least one bearing positioned directly between said rotor housing and said ring gear;
a driveline component coupled directly to said planet carrier wherein said gear assembly and said rotor cooperate to rotate said rotor at a faster speed than said driveline component to allow the motor assembly to operate in a more efficient operating range for low speed vehicle applications; and
wherein said driveline component comprises a single through-shaft that provides both input to the motor assembly and output from the motor assembly, and wherein driveline component comprises at least one of an engine output member, a transmission input member, a transmission output member, and an axle input member.

2. The motor assembly according to claim 1 wherein said stator and said rotor are comprised of laminated stacks of material such that said stator and said rotor form a switched reluctance motor with said stator surrounding an outer peripheral surface of said rotor such that said rotor housing defines said internal cavity for housing said gear assembly.

3. The motor assembly according to claim 1 wherein said driveline component and said stator are coaxial with said axis.

4. The motor assembly according to claim 1 wherein said driveline component rotates at a driveline rotational speed and said rotor rotates at a motor rotational speed with said gear assembly causing said motor rotational speed to be at least three times faster than said driveline rotational speed.

5. The motor assembly according to claim 1 wherein the motor assembly comprises a switched reluctance motor that increases or decreases torque to said driveline component via said gear assembly to provide additional driving input and braking input as needed as part of a parallel hybrid vehicle system.

6. The motor assembly according to claim 1 including a seal supported directly on said planet carrier, said seal engaging one of said ring gear and said stator housing.

7. The motor assembly according to claim 1 wherein said stator surrounds an outer peripheral surface of said rotor and wherein said stator housing is comprised of at least first and second stator housing portions that form end faces of the motor assembly, and wherein said rotor housing is positioned centrally between said first and second stator housing portions, and wherein said rotor housing is positioned axially inboard of said planetary gear set such that said at least one planetary gear set is positioned axially between one of said first and second stator housing portions and said rotor housing.

8. A motor assembly:
a stator supported by a stator housing;
a rotor supported by a rotor housing and rotable an axis relative to said stator, wherein said rotor housing defines an internal cavity;
a gear assembly coupled to said rotor and positioned within said internal cavity wherein said gear assembly comprises at least one planetary gear set including a sun gears coupled to said rotor, a ring near fixed to said stator housing, a plurality of planet gears in meshing engagement with said sun and said ring gear,and a planet carrier supporting said plurality of planet gears;
at least one bearing positioned directly between said rotor housing and said ring gear;
a driveline component coupled directly to said planet carrier wherein said gear assembly and said rotor cooperate to rotate said rotor at a faster speed than said driveline component to allow the motor assembly to operate in a more efficient operating range for low speed vehicle applications; and
wherein said at least one planetary gear set comprises first and second planetary gear sets enclosed within said internal cavity, said first planetary gear set being coupled to said driveline component at a first connection interface and said second planetary gear set being coupled to said driveline component at a second connection interface axially spaced from said first connection interface along said axis.

9. A parallel hybrid vehicle system comprising:
a transmission receiving driving input from an engine;
a drive axle receiving driving input from said transmission wherein the engine, transmission and drive axle cooperate to comprise a vehicle driveline;
at least one switched reluctance motor receiving input from a driveline component in said vehicle driveline, said at least one switched reluctance motor including a stator supported by a stator housing and a rotor supported by a rotor housing, said rotor housing defining an internal cavity, and wherein said driveline component comprises a single through-shaft that provides both input to the at least one switched reluctance motor and output from the atleast one switched reluctance motor;
a gear assembly enclosed within said internal cavity, said gear assembly being coupled to said rotor and said driveline component, and wherein said gear assembly comprises at least one planetary gear set including a sun gear coupled to said rotor, a ring gear fixed to said stator housing, a plurality of planet gears in meshing engagement with said sun gear and said ring gear, a planet carrier directly coupled to said driveline component and supporting said plurality of planet gears, and at least one bearing positioned directly between said rotor housing and said ring gear; and
wherein said gear assembly and said rotor cooperate to rotate said rotor at a faster speed than said driveline component to allow said at least one switched reluctance motor to operate in a more efficient operating range for low speed vehicle applications.

10. The parallel hybrid vehicle system according to claim 9 wherein said single through-shaft, said sun gear, and said planet carrier are coaxial with said axis.

11. The parallel hybrid vehicle system according to claim 9 wherein said single through-shaft directly drives a drive axle.

12. The parallel hybrid vehicle system according to claim 9 wherein said single through-shaft directly drives a transmission.

13. The parallel hybrid vehicle system according to claim 9 wherein said at least one switched reluctance motor increases or decreases torque to said single through-shaft via said gear assembly to provide additional driving torque and braking torque as needed, and wherein said at least one switched reluctance motor stores energy during braking.

14. The parallel hybrid vehicle system according to claim 9 including a seal supported directly on said planet carrier, said seal engaging one of said ring gear and said stator housing.

15. The parallel hybrid vehicle system according to claim 9 wherein said stator surrounds an outer peripheral surface of said rotor and wherein said stator housing is comprised of at least first and second stator housing portions that form end faces of the motor assembly, and wherein said rotor housing is positioned centrally between said first and second stator housing portions, and wherein said rotor housing is positioned axially inboard of said planetary gear set such that said at least one planetary gear set is positioned axially between one of said first and second stator housing portions and said rotor housing.

16. A motor assembly for a drive axle comprising:

stator supported by stator housing;

rotor supported by a rotor housing and being coupled to a driveline component for rotation about an axis, said rotor housing defining an internal cavity; and a gear assembly enclosed within said internal cavity, said gear assembly being coupled to said rotor and said driveline component, and wherein said gear assembly comprises at least one planetary gear set and said driveline component comprises a single through-shaft that provides both input to the motor assembly and output from the motor assembly;

wherein said at least one planetary gear set includes a sun gear coupled to said rotor, a ring gear fixed to said stator housing, a plurality of planet gears in meshing engagement with said sun gear ans said ring gear,and a planet carrier supporting said plurality of planet gears and being directly coupled to said single through-shaft, and including at least one bearing mounted directly between said rotor housing and said ring gear; and wherein said single through-shaft directly drives a drive axle.

17. The motor assembly according to claim 16 wherein said at least one planetary gear set comprises first and second planetary gear sets enclosed within said internal cavity, said first planetary gear set being coupled to said driveline component at a first connection interface and said second planetary gear set being coupled to said driveline component at a second connection interface axially spaced from said first connection interface along said axis.

18. The motor assembly according to claim 16 including a seal supported directly on said planet carrier, said seal engaging one of said ring gear and said stator housing.

19. The motor assembly according to claim 16 wherein said stator surrounds an outer peripheral surface of said rotor and wherein said stator housing is comprised of at least first and second stator housing portions that form end faces of the motor assembly and wherein said rotor housing is centrally positioned between said first and second stator housing portions, and wherein said rotor housing is positioned axially inward of said planetary gear set such that said at least one planetary gear set is positioned axially between one of said first and second stator housing portions and said rotor housing.

20. The motor assembly according to claim 17 wherein said stator surrounds an outer peripheral surface of said rotor and wherein said rotor housing is centrally positioned between first and second stator housing portions that form said stator housing, and wherein said rotor housing is positioned axially between said first and said second planetary gear sets.

* * * * *

UNITED STATES PATENT AND TRADEMARK OFFICE
CERTIFICATE OF CORRECTION

PATENT NO. : 7,530,912 B2 Page 1 of 1
APPLICATION NO. : 11/370413
DATED : May 12, 2009
INVENTOR(S) : Kramer It is certified that error appears in the above-identified patent and that said Letters Patent is hereby corrected as shown below:

Claim 8, Column 6, Line 6: Add "about" between "rotable" and "an"

Claim 8, Column 6, Line 14: Add "gear" between "sun" and "and"

Claim 8, Column 6, Line 16: Replace "direct1y" with "directly"

Claim 16, Column 7, Line 25: Add "a" before "stator" at the beginning of the line Claim 16, Column 7, Line 26: Add "a" before "rotor" at the beginning of the line Claim 16, Column 8, Line 1: Change "ans" to read as "and"

Signed and Sealed this

Fourth Day of August, 2009

JOHN DOLL
*Acting Director of the United States Patent and Trademark Office*